R. RICHARDS.
MACHINE FOR CUTTING LEATHER.
No. 3,857. Patented Dec. 16, 1844.
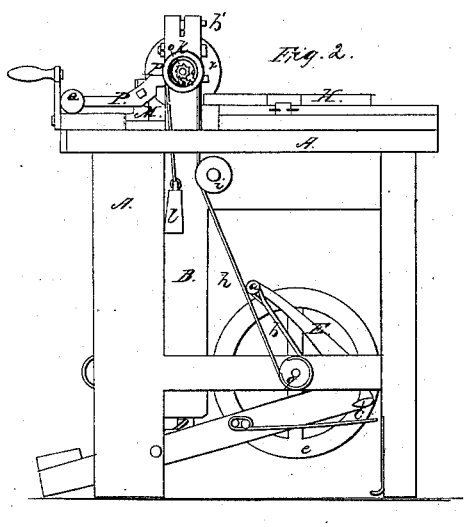
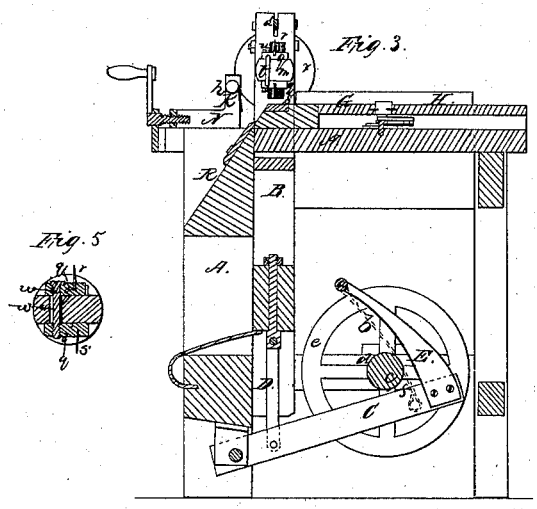
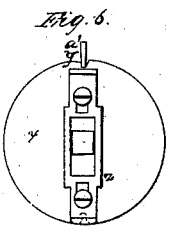
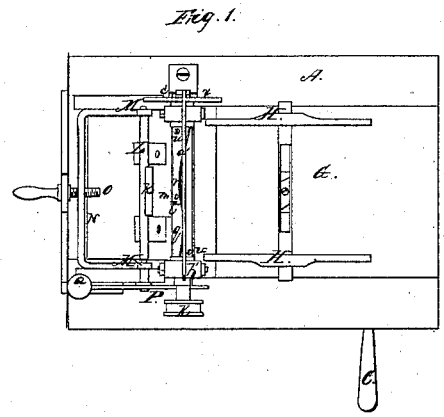
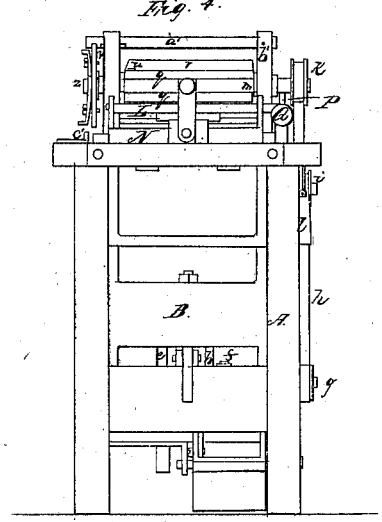

UNITED STATES PATENT OFFICE.

RICHARD RICHARDS, OF LYNN, MASSACHUSETTS.

CUTTING SOLES.

Specification of Letters Patent No. 3,857, dated December 16, 1844.

*To all whom it may concern:*

Be it known that I, RICHARD RICHARDS, of Lynn, in the county of Essex and State of Massachusetts, have invented certain Improvements in Machinery for Cutting Leather into Soles, and that the following description and accompanying drawings taken in connection constitute a full and exact specification of the construction and operation of my said invention.

Figure 1, of the drawings above mentioned represents a top view of my machine. Fig. 2, is a side elevation. Fig. 3, is a longitudinal, vertical and central section. Fig. 4, is an elevation of the end nearest to the cutting knives. Such other drawings as may be necessary to the following description will be referred to and described therein.

So far as my machine consists of one or more cutters suitably arranged in framework and capable of being raised from and depressed upon a platform beneath them for the purpose of supporting the leather during the operation of cutting it does not differ from many other machines in common use.

A, Figs. 1, 2, 3, is the framework or table, which sustains the operative parts and within which a frame B is arranged in the position as seen in the drawings, and sustained in suitable bearings—in which it may be freely moved up and down—in a vertical direction, the object of the frame being to carry and elevate and depress the cutters. The frame B is operated by the foot of the attendant applied upon a treadle C, the said treadle being connected to the frame B, by a suitable roll D, jointed at its lower extremity to the treadle and at its upper to the frame, the same being seen in Fig. 3. A curved arm, E projects upward from the treadle and has at its upper end a projection $a$, to which one end of a strap $b$ is attached, the said strap being wound around and attached at its other end to a pulley or drum $c$, fixed upon a main, transverse shaft $d$ upon which is a fly wheel $e$. Another strap $f$ is attached at one end to and wound around the drum $c$, in a reverse direction to that of the strap $b$ and extends downward and is secured at its other end to the treadle, so that the movement of the treadle by the foot causes a motion first in one direction and next in the opposite, of the balance or fly wheel $e$. A small pulley $g$ is fixed upon one end of the shaft $d$, a strap or band $h$, being attached to the periphery of the pulley and passing partly around it, thence upward in contact with a guide pulley $i$, thence over a pulley $k$, and thence downward, and having a weight $l$ appended to it as seen in the side elevation. The pulley $k$, runs loose upon the end of the knife or cutter shaft $m$, and has a small dog or pawl $n$, jointed to its side and pressed against the toothed circumference of a ratchet wheel $o$ by a spring $p$—the ratchet wheel being fixed upon the end of the cutter shaft. The cutter shaft $m$, turns or revolves in suitable bearings in the frame B. It has the holders or plates $q$, $q$, of the two cutters or bent knives $r$, $s$, confined upon it, between its bearings as seen in the drawings. Each of said holders is formed rectangular in its cross section and rests upon the shaft, which is formed to receive it, the one holder, with its knife being directly over the other and its knife, that is to say, the holders being on opposite sides of the shaft and so arranged that the two knives which are to be curved alike, shall be brought into line transversely with each other throughout the curves of both. The two holders of the knives turn midway between their ends upon a pin $t$, which extends through and is fixed in the cutter shaft and projects from the same into each holder, so that when the end of one, or adjacent ends of both of the holders is moved transversely in one direction the other end of the same, or other adjacent ends of both, will be equally moved in an opposite direction; thus enabling us at any time to narrow or widen the toe or heel of the sole as occasion may require.

The adjacent ends of the cutter holders are confined down upon the shaft, by a screw $u$ or $v$, which passes through one of the holders and the shaft and is screwed into the other holder—there being an elongated slot or opening formed transversely through the shaft for each screw to pass and move through, when the adjacent ends of the cutter holders are moved to the right or left transversely. Fig. 5, denotes a vertical cross section of the cutter shaft and cutter holders taken through one of the confining screws and its slot, $u$ being the screw and $w$ the slot.

On the end of the cutter shaft opposite to that on which the loose pulley is placed, a circular plate $x$ is fixed, the said plate having two notches formed in its circumference on opposite sides of its center and at one hundred and eighty degrees distant from the center of one to that of the other; the said notches being arranged in a vertical line with each other. An end view of this plate is given in Fig. 6 in which one of the notches is seen at $y$, the other being covered by the lower end of a slide $z$, which is adapted to the surface of the plate, so as to play up and down vertically—the length of the said slide being equal to the diameter of the plate diminished by the depth of one of the notches.

A latch $a'$ is arranged horizontally over the cutters, and turns on a fulcrum or joint at $b'$, in such manner as to allow its end over and which is in contact with the circular plate $x$, to play up and down vertically.

A stud or other analogous contrivance $c'$ projects vertically from the frame A,—directly underneath the slide L—and has its top graduated or situated at such a distance from the lower end of the slide that when the frame B descends so as to carry either one of the cutters through the leather to be cut, the said stud will come into contact with the slide and elevate the same to such extent as to throw the latch $a'$ out of the notch and thereby permit the cutter shaft to be partially revolved so as to bring the knife which was previously upward into the position of the one which last performed its cutting operation, and thereby turn the circular plate so as to cause the latch to fall into the other notch. The partial revolution of the cutter shaft is effected by the treadle, when it rises, acting through the arm E, and the mechanism directly intervening between it and the cutter shaft. When the treadle is depressed the loose pulley upon the cutter shaft, carries the dog or pawl over the teeth of the ratchet wheel $o$; that is to say, causes it to slip or slide over the same; but the instant the direction of the pulley is reversed by the band $h$—which is wound upon the pulley $g$—the dog acts in the teeth of the ratchet wheel and turns the cutter shaft.

The leather to be cut into soles, being previously reduced to a proper width, is placed upon the table or platform G and between parallel guides H, H. It is pressed forward beneath the cutting knife until it comes into contact with a vertical gage plate K, which extends downward from a horizontal shaft L supported and moving in bearings M, M in a frame N, which is capable of being moved toward or from the cutter by a screw O or any other suitable contrivance.

The shaft L has a bent lever P fixed upon one end as seen in Figs. 1, 2, the said lever extending in one direction toward and underneath the cutter shaft and being borne up against the said shaft by a weight Q applied upon its opposite end.

From the above, it will be seen that the depression of the frame B, will cause the end of the lever P first mentioned, to descend and thereby turn the shaft L a little in its bearings in such manner as to cause the lower end of the gage plate to move in a direction away from the cutter, and allow the piece of leather separated from the sheet thereof to fall freely away from the same, and drop upon an inclined plane R, over which it slides out of the machine.

Having thus described my machinery that which I claim is as follows, viz:

1. I claim the above-specified manner of operating the cutting knives $r$, $s$, applied upon the revolving shaft $m$, viz, the arranging said knives as described upon a revolving shaft, and causing them and the shaft to be partially revolved at suitable periods of time, in the manner as set forth, so as alternately to bring each cutting knife in succession into the required position for it to cut through the leather when depressed by the frame or mechanism by which it is made to act upon the same.

2. I also claim, in combination with the above, giving to the gage plate (K), at the time of, or soon after the depression of, either knife into the leather, a motion in a direction away from the cutting knives, in order to permit the piece of leather separated from the sheet thereof to fall freely away from the same, as described.

3. I also claim the combination of mechanical parts by which the requisite degrees of rotary motion of the shaft which carries the cutting knives are determined in the manner herein before described—the said parts being the notched circular plate $x$, applied upon the rotary cutter shaft, the catch or latch $a'$ the slide Z upon the circular plate, and the fixed stud or other analogous contrivance by which the slide is moved when the knife frame is depressed; the whole being applied and operating substantially as described.

4. I also claim attaching the knife holders to the revolving shaft $m$ in such manner as to admit of a corresponding movement of their adjacent ends in transverse direction one and the same time, and the fixing the said ends afterward to the shaft the same being for the purpose of narrowing or widening the toe or heel of the sole as set forth.

In testimony that the above is a correct specification I have hereto set my signature this twenty-first day of September, A. D. 1844.

RICHARD RICHARDS.

Witnesses:
R. H. EDDY,
JOHN NOBLE.